United States Patent
Hahn et al.

[11] Patent Number: 5,735,735
[45] Date of Patent: Apr. 7, 1998

[54] METHOD FOR THE AUTOMATIC GUTTING OF FISH AND AN APPARATUS FOR IMPLEMENTING THE METHOD

[75] Inventors: Peter Hahn; Günther Pinkerneil, both of Lübeck; Klaus Dieter Nüske, Stockelsdorf, all of Germany

[73] Assignee: Nordischer Maschinenbau Rud. Baader GmbH & Co KG, Lubeck, Germany

[21] Appl. No.: 551,340

[22] Filed: Nov. 1, 1995

[30] Foreign Application Priority Data

Nov. 4, 1994 [DE] Germany ............. 44 39 158.7

[51] Int. Cl.$^6$ ................................. A22C 25/14
[52] U.S. Cl. ............... 452/119; 452/109; 452/121; 452/116
[58] Field of Search ................ 452/119, 106, 452/107, 109, 110, 118, 121, 173, 116, 117

[56] References Cited

U.S. PATENT DOCUMENTS

| | | | |
|---|---|---|---|
| 3,187,376 | 6/1965 | Laws | 452/119 |
| 3,510,910 | 5/1970 | Erkins | 452/107 |
| 3,550,193 | 12/1970 | Smith | 452/119 |
| 3,838,478 | 10/1974 | Wulff | 452/119 |
| 3,925,846 | 12/1975 | Leander | 452/110 |
| 4,630,335 | 12/1986 | Claudon | 452/110 |
| 5,026,318 | 6/1991 | Jahner | 452/121 |

FOREIGN PATENT DOCUMENTS

| | | | |
|---|---|---|---|
| 258941 | 3/1988 | European Pat. Off. | 452/106 |
| 1679041 | 12/1971 | Germany . | |
| 4100319A1 | 7/1992 | Germany . | |
| 194101 | 1/1965 | Sweden | 452/106 |
| 316 423 | 5/1968 | U.S.S.R. . | |
| 254 038 | 12/1968 | U.S.S.R. . | |
| 2 090 722 | 7/1982 | United Kingdom . | |

*Primary Examiner*—Willis Little
*Attorney, Agent, or Firm*—Fay,Sharpe,Beall,Fagan,Minnich & McKee

[57] ABSTRACT

In a method for automatically gutting fish of the catfish species, the belly cavity is opened around the anal orifice either before or after opening the gills by severing the gullet and opening the blood stream, and the contents of the belly cavity are removed by pushing these from one of the openings of the cavity out of the other. In a machine for carrying out this method, the fish are conveyed sideways by a recessed conveyor. The belly cavity is opened in the vicinity of the anus by separating away the cartilaginous plate carrying the ventral fins. The contents of the ventral cavity are removed by a rotary body rotating synchronously with the conveyor and having tools successively arranged in a cantilevered helix around its circumference which comprise a clearing tool with scraping segments, a brush tool, a high-pressure spray device and a cutting tool for slitting open the belly cavity along its length.

15 Claims, 2 Drawing Sheets

METHOD FOR THE AUTOMATIC GUTTING OF FISH AND AN APPARATUS FOR IMPLEMENTING THE METHOD

BACKGROUND OF THE INVENTION

1. Field of the Invention

The invention concerns a method for the automatic gutting of fish, particularly fish of the catfish family or ictaluridae species, and an apparatus for carrying out the method.

2. Prior Art

A machine is known from SU-US 254 038 which utilizes an endless conveyor having transverse recesses for receiving the fish on their backs with their longitudinal axis transverse to the direction of conveyance. The fish are opened with a cut from the belly through to the backbone in the area of the gills and are subsequently processed on the lower run of the conveyor by a gutting tool. The gutting tool comprises a rotating member having tools arranged helically one after the other thereon and guided around a circular path. The first tool is formed as a spike with a point which is directed in the rotation direction and from which an inner blade converges spirally towards the rotational axis of the rotating member. A brush device is directly connected to this tool as the second tool. The rotating member and the conveyor are driven synchronously and arranged relative to one another such that the point of the first tool penetrates into the transverse opening of the gill cut revealed on bending the fish head backwards, and exits through the anal orifice, so that the inner blade makes a longitudinal opening in the ventral cavity between the entry and exit points of the spike. This process is followed by the removal of the entrails by sweeping the opened ventral cavity.

A similar apparatus is also known from SU-US 316 423. In this apparatus, the fish is held with its belly downwards and its back upwards and is transported transverse to its longitudinal axis. The gutting tool described above then processes the fish from below.

The gutting result achievable with either apparatus is not satisfactory. This is due particularly to the fact that the end of the intestine is not expressly severed from its point of attachment to the body at the anal orifice and the longitudinal opening of the ventral cavity causes the fish to be laterally unstable so that effective cleaning the ventral cavity over its entire section is not possible. This specifically results in the inefficient removal of the blood vessels present in the belly cavity, which is essential for attaining a high-quality fillet product, since remains of blood can discolour the flesh and even cause it to spoil prematurely. Moreover, these machines cannot be employed for fish of the species ictaluridae, because of their particular anatomical characteristics in the area of the anal orifice and the ventral cavity.

3. Objects of the Invention

It is thus a main object of the invention to provide a method, which while protecting the structure of the fish flesh allows an excellent gutting result to be obtained particularly with catfish of the species ictaluridae.

It is furthermore an important object of the invention to provide an apparatus which allows the method to be realized in an inexpensive manner.

SUMMARY OF THE INVENTION

The objects are achieved in a method by opening one end of the fish ventral cavity by cutting out the anal orifice, opening the other end of the ventral cavity by performing a transverse cut through the gullet of the fish from the ventral side up to the backbone, and removing the entrails from one of the ends of the ventral cavity by applying a force to act within the ventral cavity from the other end of the ventral cavity. The advantages attainable with the invention are specifically that the belly cavity remains closed in section during the cleaning operation and the process works according to a bottle brush effect which ensures the severence of the membranes and the opening and removal of the blood vessels within the belly cavity. Furthermore, the cut to open the rear of the ventral cavity automatically severs the base of the intestine and consequently its connection to the fish body, allowing it to be expelled fully under the applied force.

The invention can be applied particularly effectively to fish of the species ictaluridae, as this species is characterized by a cartilaginous plate located in the anal region and carrying the ventral fins. The belly cavity can therefore be efficiently opened around the anal orifice and the intestine severed by cutting away the cartilaginous plate.

This method may be carried out in an inexpensive and labour saving manner by a machine comprising, conveying means having recesses for receiving and conveying fish transverse to their longitudinal axes, means for cutting opening one end of the ventral cavity by performing a transverse cut through the gullet of the fish, means for cutting out the fish anal orifice to open the other end of the belly cavity, and rotary means for clearing the belly cavity, adapted to be inserted through one opening of the ventral cavity to force the contents of the ventral cavity out of the other ventral cavity opening. This apparatus primarily prevents injuries to personnel which occur during manual processing.

BRIEF DESCRIPTION OF THE DRAWINGS

Other objects of the present invention will become apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE PREFERRED EMBODIMENTS

Figure 1:
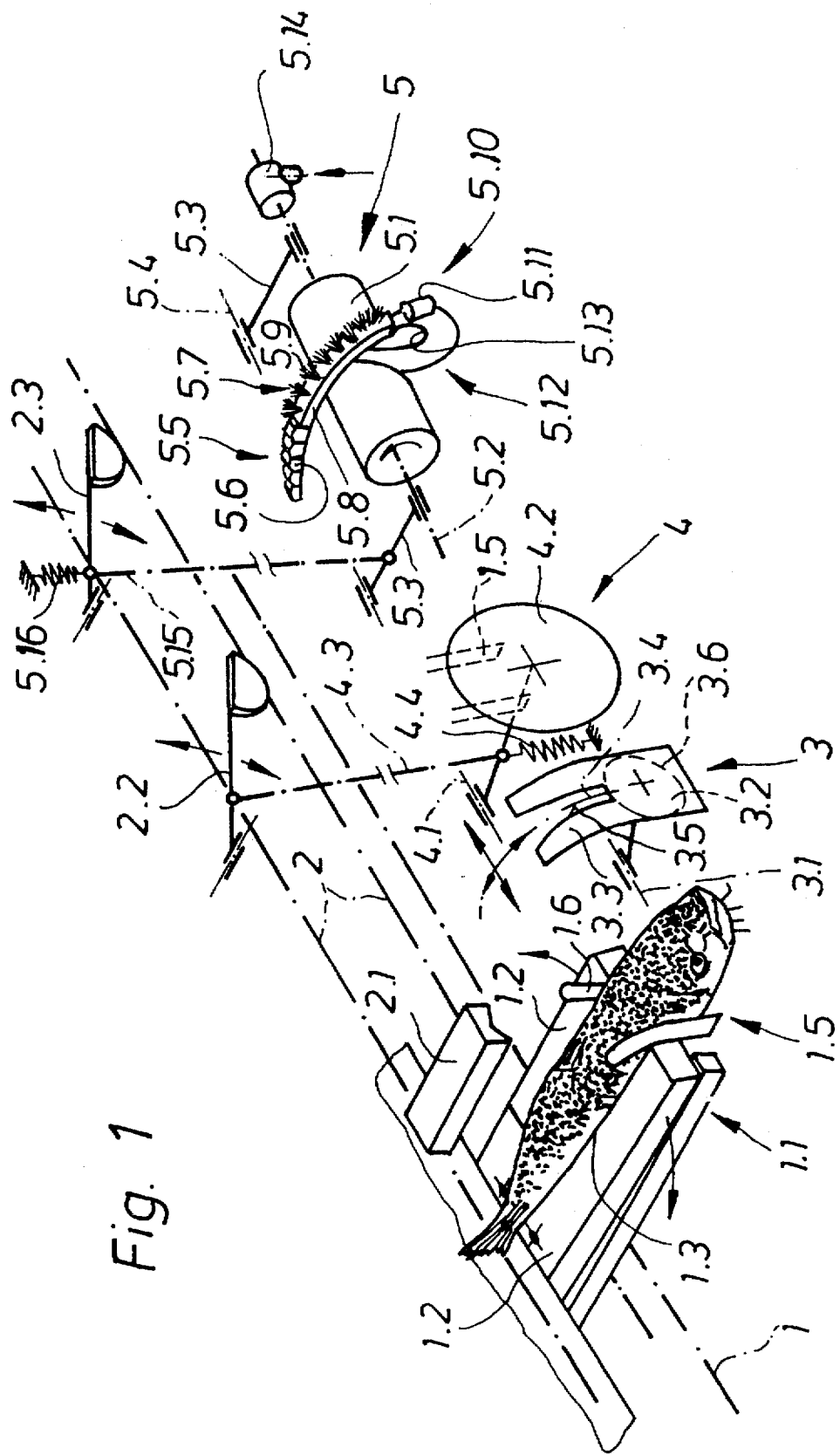
FIG. 1 shows a simplified view of the machine in perspective representation containing a fish of the species ictaluridae.
Figure 2:
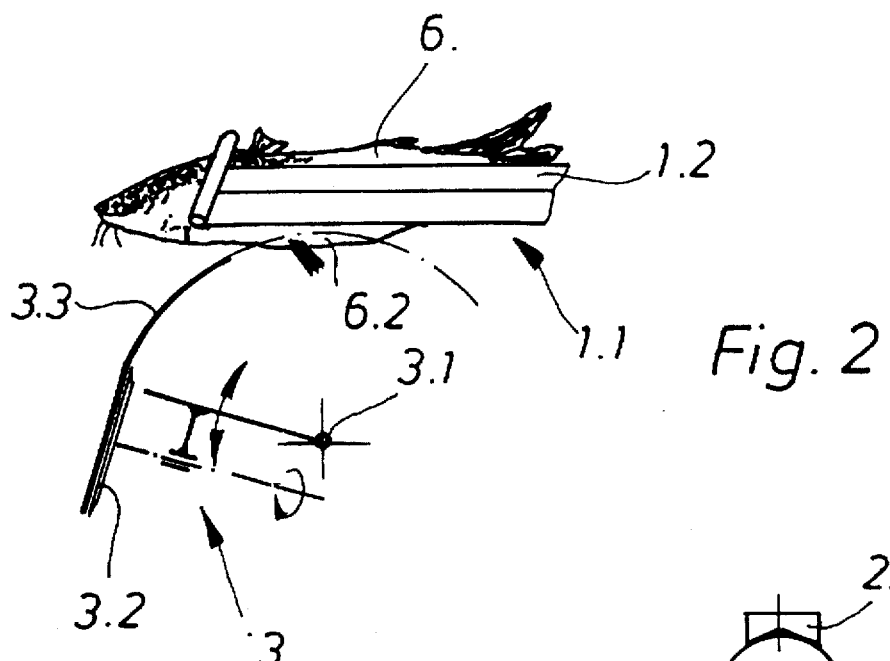
FIG. 2 shows a partial sectional view through the machine of the device for opening the belly cavity around the anal opening.
Figure 3:
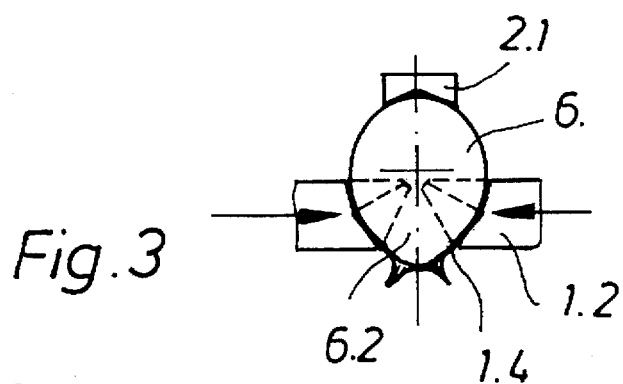
FIG. 3 shows a front view of a trough with associated retaining element.
Figure 4:
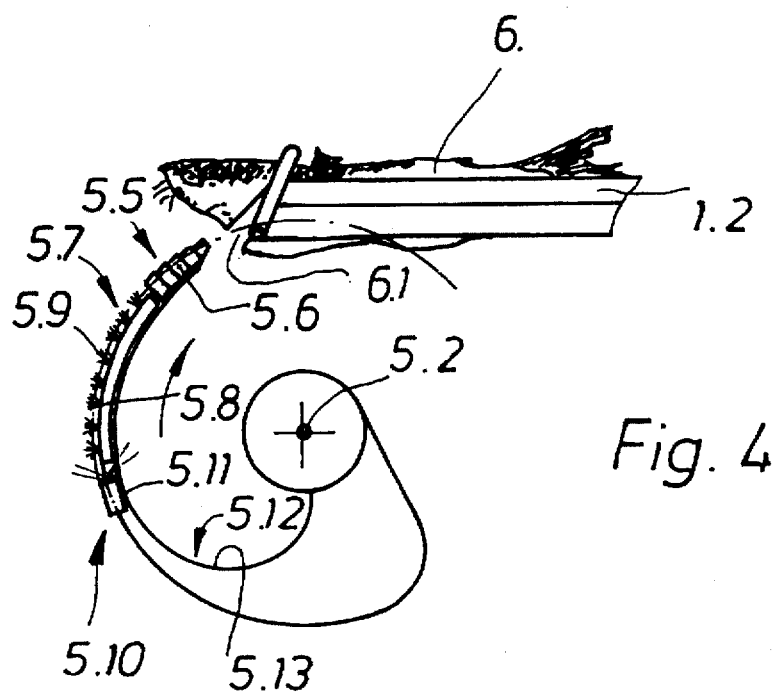
FIG. 4 shows a partial sectional view through the machine of the device for cleaning out the belly cavity.

An endless conveyor 1 for conveying the fish, a retaining conveyor 2 associated with the upper run of the conveyor 1 and devices for opening the belly cavity around the anal opening, hereinafter referred to as the anal cue device 3, for opening the gills, hereinafter referred to as the gullet cut device 4, and for clearing the belly cavity, hereinafter referred to as the gutting device 5 are arranged in a frame of a fish processing machine which is represented only schematically.

The endless conveyor 1 is driven in a suitable manner and equipped with a plurality of troughs 1.1, which serve to receive the fish in a swimming position, i.e. on their bellies and with their longitudinal axes oriented transverse to the conveying direction.

Each trough 1.1 comprises of a pair of trough elements 1.2, which are arranged in the plane of the conveyor and synchronously held against one another under spring force. The trough elements 1.2 form a hollow or recess which is adapted to the shape of the fish around the belly by being essentially V-shaped and converging towards one end of the trough. An adjustable gap 1.4 is located at the base of the recess. At the front of the other end of the trough, each trough element 1.2 is provided with a fork element 1.5 which serves as alignment means and comprises a guiding portion 1.6 which projects above the trough element 1.2. When the trough 1.1 is viewed from the front, the fork elements 1.5 resemble a Y with a split trunk. On the upper run of the conveyor, the troughs 1.1 are guided in a horizontal plane.

The retaining conveyor 2 is driven to move synchronously with the conveyor 1 and equipped with retaining elements 2.1. On the upper run of the conveyor 1, a retaining element 2.1 is associated with each trough 1.1 of the conveyor 1 and accompanies the latter throughout the processing operation. Each retaining element 2.1 comprises on its underside an angularly recessed portion extending transversely to the conveying direction which may be provided with spikes extending from the angle. The retaining conveyor 2 is guided such that the undersides of the retaining elements 2.1 are in contact with, and press against, the backs of the fish. The pressure exerted can be controlled by means of the plurality of resilient pressing elements, of which only two, 2.2 and 2.3, are represented in the drawings.

The anal cut device 3 comprises a unit arranged below the upper run of the conveyor 1 and pivotally mounted on an axle 3.1, which is fixed with respect to the frame and extends in parallel with the conveyor. The unit comprises a guiding shoe 3.3 which is followed in the direction of movement by a circular knife 3.2, driven in an appropriate manner to rotate. The guiding shoe 3.3 comprises a guiding slit 3.4 extending in the direction of angular movement and being closed at its rear end by the circular knife 3.2. The cutting plane of the circular knife 3.2 lies parallel to the direction of conveyance as it is pivoted about the axle 3.1. The guiding slit 3.4 is laterally limited by edges 3.5, which are formed as blunt blades. In the region in front of cutting edge 3.6 of the circular knife 3.2, the guiding shoe 3.3 is substantially formed as section of a cylinder, which has an axis corresponding to the axle 3.1 and which is arranged almost tangentially to the base of the troughs 1.1. The pivotal movement of the anal cut device 3 is implemented by means of a suitable, non-represented adjustment member, and is combined with a displacement component in the axial direction such that synchronous associated movement of the device 3 and the trough 1.1 occurs when the former is pivoted into its operative position.

The gullet cutting device 4 consists of a unit arranged below the upper run of the conveyor 1 and pivotally mounted on an axle 4.1, which is fixed with respect to the frame and extends parallel to the conveying direction. This unit comprises a circular knife 4.2, which is driven in a suitable manner to rotate and is arranged with its cutting plane extending parallel to the conveyor 1 and directly adjacent the path described by the advancing fork elements 1.5. The gullet cutting device 4 is joined to the pressing element 2.2 of the retaining conveyor 2 arranged above it by means of an articulated connection in the form of a coupling mechanism 4.3, which is only schematically represented in FIG. 1. As a consequence, the degree of pivotal movement of the device 4 and thus the depth of the cut made by the circular knife 4.2 is controlled in accordance with the displacement of the pressing element 2.2 caused by each individual fish. In this operation a restoring spring 4.4 serves to restore the device 4 to its original position after a fish has passed.

The gutting apparatus 5 comprises a rotating member 5.1, which is driven in an appropriate manner to rotate and is arranged below the upper run of the conveyor 1. The axle of rotation 5.2 of the rotating member 5.1 is mounted on a pair of horizontally arranged connecting rods 5.3, which are arranged to pivot about a frame-fixed axle 5.4 and carry the axle 5.2 of the rotating member 5.1 such that it lies in a plane lying parallel to the plane of the conveyor 1 but diverges from the conveying direction. The rotating member 5.1 is provided with tools arranged successively in a screw thread-like manner around its circumference. These tools are formed as a cantilever and are guided around a circular path which is concentric with the axle 5.2 of the rotating member 5.1 and intersects the trough elements 1.2. According to the order of operation, the tools include: a clearing tool 5.5, comprising a scraping element 5.6 adapted to the sectional profile of the belly cavity and having a front end converging in a wedge-like manner and an outer surface formed so as to present a rough surface directed towards its end; a brush tool 5.7, comprising a segmented body 5.8 with outwardly directed bristles 5.9; a high pressure spray device 5.10 having a nozzle 5.11 for generating a fan-shaped water jet and a cutting tool 5.12 with a cutting blade 5.13 directed in the sense of rotation and extending sickle-like towards the axle 5.2. The nozzle 5.11 is supplied with high pressure water via a rotary gasket 5.14. As symbolically indicated in FIG. 1, an articulated coupling mechanism 5.15 connects the gutting device to the pressing element 2.3 of the retaining conveyor 2 positioned above it. The device 5 is thus lifted, i.e. the depth of operation of the tools 5.5, 5.7 and 5.10 are controlled, in accordance with the displacement of the pressing element 2.3 effected by each individual fish. The restoring spring 5.16 then serves to restore the device 5 to its original position after a fish has passed.

The operation of the machine according to the invention is described in the following with reference to the processing of a fish of the species ictaluridae.

A fish to be processed 6 is positioned with its belly downmost and its tail extending rearwardly between the guiding portions 1.6 of the fork elements 1.5 such that the guiding portions 1.6 are tangential to the flanks of the fish directly behind the gill flaps. The fish is then pushed into the receiving trough 1.3 such that the trough elements 1.2 are pushed apart and the fork elements 1.5 penetrate into the soft structure located behind the gill flaps.

A retaining element 2.1 of the retaining conveyor 2 is then brought into contact with the back of the thus fixed and positioned fish, and the latter is subsequently advanced by the conveyor 1. During this operation, a defined force is applied by the pressing elements 2.2 or 2.3 which causes the belly structure of the fish comprising the cartilaginous plate 6.2 to be forced through the gap 1.4 at the base of the trough 1.3. The fish then arrives in the operating area of the anal cut device 3 which begins to pivot upwards at the moment when the longitudinal axis of the fish corresponds to the axis of symmetry of the device 3. The guiding shoe 3.3 then surrounds and gathers up the cartilaginous plate 6.2 before this is sheared off by the circular knife 3.2 with the consequence that the belly cavity of the fish is opened around the anal orifice and the end portion of The intestine is severed.

The fish subsequently arrives in the operating area of the gullet cutting device 4. This moves directly adjacent the fork elements 1.5 of the trough 1.1 to perform a transverse cut in the fish which penetrates to the backbone so that all structures located in this sectional area are severed. During this operation, the depth of penetration of the circular knife 3.2 is controlled according to the size of the fish by means of the height of the fish back.

The fish is then advanced to the gutting device 5 with the gill cavity 6.1 open, and non-shown means ensure that the belly cavity can be accessed longitudinally by bending the fish head backwards about its neck away from the cut surface formed by the gullet cutting device 4. In the gutting device 5, the rotation of the rotary member 5.1 and the progression of the conveyor 1 are synchronized in such a way, and the pitch of the helical arrangement of the processing tools is selected such that the first effective cleaning tool 5.5 is ready for operation on the arrival of the fish in a position corresponding to the symmetry axis of the fish so as to penetrate through the gullet cut into the belly cavity. As the conveyor 1 advances, the entrails are pushed out of the belly cavity opening produced by the anal cut device 3, and further cleaning is effected by the following brush tool 5.7 and the high pressure spray device 5.10. The belly cavity is subsequently opened by means of the cutting tool 5.12, which effects a longitudinal cut from the inside of the belly cavity to the outside.

Due to the fact that the cleaning is carried out with the belly cavity closed, the generally problematic removal of the dermis covering the blood vessels, and the opening of the blood stream can be effected without difficulties and without damage to the fish.

The fish processed in this manner can, if necessary, subsequently be headed by a non-shown head knife mounted fixedly on the frame.

The embodiment described above is just one of several arrangements of the components according to the invention which can effect the thorough and reliable gutting of fish. It will be appreciated that it is unimportant whether the above described anal cut device 3 comes into operation before or after the gullet cutting device 4. Likewise the clearing of the belly cavity by the gutting device can be effected either by pushing the entrails from front to back as described above or from back to front with the tool 5.5 entering by the anal opening. In other words, it is essential that the belly cavity be opened only at its ends to form a tunnel structure, whereby the rear opening of the cavity is performed so as to remove the anal opening and thereby simultaneously ensure the severence of the connection between the intestine and the ventral wall of the fish. In this way, when the clearing tool 5 is inserted at one end, pressure builds up within the structure to expel the entrails fully from the other end. Moreover, the closed structure means that the tool 5 maintains a better contact with the walls of the belly cavity and can remove the blood vessels completely and reliably.

We claim:

1. A method for automatically gutting fish, comprising the steps:
   a) opening one end of the fish ventral cavity around the anal orifice,
   b) opening the other end of the ventral cavity by performing a transverse cut through the gullet of the fish from the ventral side up to the backbone to create a closed ventral portion intermediate said openings, and
   c) removing the entrails from one of the ends of the ventral cavity by applying a force to act within the ventral cavity from the other end of the ventral cavity.

2. A method for automatically gutting fish according to claim 1, wherein the fish are of the catfish species (ictaluridae), wherein the opening of the one end of the ventral cavity around the anal orifice is effected by cutting out a cartilaginous plate located on the ventral side which carries the ventral fins.

3. An apparatus for automatically gutting fish comprising
   a) conveying means having recesses for receiving and conveying fish transverse to their longitudinal axes,
   b) means for cutting open one end of the ventral cavity by performing a transverse cut through the gullet of the fish,
   c) means for cutting out the fish anal orifice to open the other end of the belly cavity to create a closed ventral portion intermediate said ends, and
   d) rotary means for clearing the belly cavity, adapted to be inserted through one opening of the ventral cavity and including means for forcing the contents of the ventral cavity out of the other ventral cavity opening.

4. An apparatus as claimed in claim 3, wherein the forcing means comprise a rotary body driven to rotate synchronously with said conveying means about an axis and having tools arranged successively in a helical form around its circumference, said tools being in a cantilever arrangement and being guided around a circular path which is essentially concentric to the axis of rotation of the rotary body and essentially parallel to the longitudinal axis of the fish, and including
   a clearing tool having a scraping segment adapted to the internal sectional profile of the belly cavity, a wedge-shaped end and a rough outer surface;
   a brush tool, following said clearing tool and comprising a segmented body having outwardly directed bristles;
   a high pressure spray device following said brush tool and having a nozzle for generating fan-shaped water jets.

5. An apparatus as claimed in claim 4, wherein said rotary means further comprises a cutting tool adapted to follow said forcing means and comprising a cutting edge extending sickle-like from the axis of rotation of the rotary body and being directed in the rotation direction.

6. An apparatus as claimed in claim 3, further comprising retaining elements for entering into contact with the back of the fish at least in areas of operation of the processing tools.

7. An apparatus as claimed in claim 6, wherein the retaining elements are components of a retaining conveyor which is supported by pressing elements, each retaining element being associated with, and synchronously accompanying a recess of the conveying means.

8. An apparatus as claimed in claim 3, wherein the recesses are adapted to receive and convey the fish on their bellies and that alignment means are provided for positioning the fish with respect to the position of their gills.

9. An apparatus as claimed in claim 6, wherein said alignment means comprise two fork elements resiliently biased towards one another for receiving the fish between them.

10. An apparatus as claimed in claim 7, wherein said recesses comprise bases with a gap for engaging the fish in the anal area.

11. An apparatus as claimed in claim 3 wherein the means for opening the belly cavity around the anal orifice comprise a circular knife with a guiding shoe, said knife being guidable along a path which is progressively tangential to the underside of said recesses.

12. An apparatus as claimed in claim 11, wherein said guiding shoe comprises a guide slit extending in the direction of motion upstream of said circular knife such that the rear end of said slit is formed by the circular knife and the lateral edges of said slit are limited by blunt cutting edges.

13. An apparatus as claimed in claim 9, wherein said means for cutting through the gullet comprises a circular knife having a cutting plane lying parallel to the conveying direction of said recesses and extending directly adjacent a path described by said fork elements.

14. An apparatus as claimed in claim 7, wherein a coupling mechanism for coupling the means for cutting through the gullet with the respective pressing element is provided to effect the adaptation of the depth of cut to the height of the respective fish.

15. An apparatus as claimed in claim 7, wherein a coupling mechanism for coupling the rotary means with the respective pressing element is provided to effect the adaptation of the plane of operation of said tools of the rotary means to the height of the respective fish.

* * * * *